United States Patent [19]

Mizianty

[11] 3,719,491

[45] March 6, 1973

[54] DIAZO-TYPE REPRODUCTION PROCESS

[75] Inventor: Michael F. Mizianty, Binghamton, N.Y.

[73] Assignee: GAF Corporation, New York, N.Y.

[22] Filed: March 11, 1971

[21] Appl. No.: 123,437

Related U.S. Application Data

[62] Division of Ser. No. 737,854, June 18, 1968, Pat. No. 3,597,413.

[52] U.S. Cl. ....................96/47, 96/75.91 R

[51] Int. Cl. ....................G03c 5/34, G03c 1/54

[58] Field of Search .......96/91, 49, 75; 260/141, 142

[56] References Cited

UNITED STATES PATENTS

| | | | |
|---|---|---|---|
| 3,539,347 | 11/1970 | Rauhut | 96/91 R |
| 2,113,944 | 4/1938 | Leach | 96/91 R |
| 3,235,382 | 2/1966 | Neugebauer et al. | 96/91 R |
| 3,615,570 | 10/1971 | Werner | 96/91 R |
| 3,597,413 | 8/1971 | Mizianty | 96/91 R |
| 3,595,660 | 7/1971 | Van Beek et al. | 96/49 |
| 3,300,471 | 1/1967 | Arrigo | 260/142 |
| 3,281,246 | 10/1966 | Rauhut et al. | 96/91 R |
| 3,281,245 | 10/1966 | Werner et al. | 96/91 R |
| 2,336,309 | 12/1943 | Snell et al. | 96/91 R |
| 3,081,166 | 3/1963 | Van Loon et al. | 96/49 |

FOREIGN PATENTS OR APPLICATIONS

| | | | |
|---|---|---|---|
| 1,080,576 | 8/1967 | Great Britain | 96/91 R |
| 1,110,835 | 4/1968 | Great Britain | 96/91 R |

OTHER PUBLICATIONS

Noller, C. R., "Textbook of Organic Chemistry," 2nd Ed., W. B. Saunders Co., 1958, p. 339–344.

*Primary Examiner*—Charles L. Bowers, Jr.
*Attorney*—Robert Gottschalk et al.

[57] ABSTRACT

A high-speed diazo-type reproduction material suitable for both one-component and two-component diazo-type reproduction processes comprising a diazonium salt of the formula

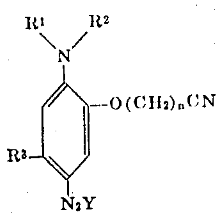

wherein $R^1$ and $R^2$ are selected from alkyl, aralkyl, and the atoms necessary to form a heterocyclic ring with the amino nitrogen atom; $R^3$ is selected from hydrogen, alkoxy, and halogen; *n* is an integer of up to 4; and Y is an anion.
Such diazonium salts are especially suited in two-component diazo reproduction processes utilizing ammonia development.

3 Claims, No Drawings

DIAZO-TYPE REPRODUCTION PROCESS

This application is a division of U.S. Patent application Ser. No. 737,854 filed June 18, 1968 now U.S. Pat. No. 3,597,413.

The present invention is directed to a high speed diazo type reproduction material useful in both one-component and two-component diazo reproduction processes; more particularly, the present invention is directed to such high-speed diazo type reproduction material having cyano alkoxy substitution meta to the diazo moiety, such high speed diazo type reproduction material being specially suited for two-component reproduction processes using ammonia development.

In a diazotype process a carrier or support, such as a sheet of paper, plastic, or the like, is provided with a light-sensitive layer or coating which includes a stabilized light-sensitive diazo compound. When the light-sensitive layer is made sufficiently alkaline, the diazo compound will react with an azo dye coupler to form an intensely colored azoic dye. The coupler is either included in the light-sensitive layer or the light-sensitive layer is treated with the coupler during a subsequent step in the process.

There are three principal diazotype reproduction processes. In all three processes an image ordinarily is produced by exposing the sensitized layer to actinic light transmitted through the original which is to be copied. The areas of the original bearing the material to be copied inhibit the passage of light (usually ultraviolet light having a wave length of from 3,400 A. to 4,100 A.) and, consequently, the diazo compound in these areas is retained. In the other areas the light reaches the sensitized layer and destroys the diazo compound. Upon completion of this printing step the base containing the diazo compound has been formed into a precise duplication of the original, the duplicate being pale yellow in color ( the color of the diazo ).

When the exposure has been completed, the image is developed by rendering the light-sensitive layer or coating alkaline. It is in this step that the three principal processes differ. In the most widely used development process the formation of the azoic dye is accomplished by contacting the light-sensitive layer with moist ammonia gas. The coating composition contains both the diazo as the light-sensitive member and the coupler which is an essentially colorless compound capable of reacting under appropriate conditions with the diazo compound to form the highly colored azoic dye. An atmosphere of warm, moist ammonia causes the diazo component and coupler to react. The function of the ammonia is to raise the pH level of the sensitive layer.

If the diazo paper is to be stored for reasonably long periods of time before it is used, the diazo and coupler components must be kept under conditions so as to prevent precoupling. Precoupling is prevented by adding certain acids to the light-sensitive layer. These acids can include organic acids such as citric, tartaric, etc., or inorganic acids such as sulfuric acid, perchloric acid, etc. Other additives that are included in the light-sensitive layer to prevent precoupling include acidic salts such as zinc chloride, magnesium chloride, cadmium chloride, etc. The combination of acids and metallic salts tends to create in the paper a reasonably high acidity level. This acidity must be neutralized by the warm, moist ammonia gas during the development stage so as to allow a basic condition to exist. As was pointed out above, such a basic condition is required if the diazo and coupling components are to combine.

Modern ammonia developing equipment for diazo systems operates at very high rates of speed, as high as 150 feet per minute. Under these conditions the length of time of contact of the light-sensitive coating or layer with the ammonia vapors is of extremely short duration. For this reason it is essential to increase the rate of neutralization of the acidic stabilizing materials during the development cycle. For this purpose, materials such as glycerine, ethylene glycol and other hygroscopic materials have been employed. These compounds accelerate the rate of neutralization by drawing moisture into the coating during the development cycle. Inasmuch as ammonia has a high affinity for moisture, it also is drawn into the coating. The humectants or hygroscopic materials also serve as a reaction medium in which development can occur. If no hygroscopic materials or humectants were included in the light-sensitive stratum or layer, one would have a coating consisting essentially of solid materials. It would then be necessary to cause a relatively difficult solid-to-solid reaction to occur in the paper. The liquid humectants or hygroscopic materials both in themselves and with the water which is drawn into the layer by the humectants serve as a reaction medium.

The second principal diazotype reproduction process is one in which the diazo-bearing support is immersed in an alkaline or acidic solution of a coupling component. The coupling component is selected so that coupling can occur under either acidic or alkaline conditions. In this so-called liquid development system it is important that the development take place across the entire coated surface of the paper or other support.

The third principal diazotype system is referred to as a heat developable system. This system differs from the first system described above in that the development of the azoic dye is effected by applying heat to the light-sensitive layer or stratum. The light-sensitive layer or stratum includes a material which produces an alkaline reaction when heated. The heat causes the generation of an alkaline substance which, in turn, neutralizes the acidic stabilizing materials and creates a condition whereby the diazonium compound and the coupler can unite.

The material most commonly used to produce an alkaline reaction when heated is urea. When urea is decomposed by heat, ammonia is generated which neutralizes the acidic materials present in the light-sensitive layer and effects development. In addition to urea, guanidine, alkyl-substituted ureas and alkyl-substituted guanidines have been used to effect coupling through the formation of ammonia.

In both wet and semi-wet diazo reproduction process, i.e., one-component processes, and dry diazo reproduction processes, i.e., two-component reproduction processes, derivatives of unilaterally diazotized para-phenylene d iamine have been employed as the photo-sensitive element.

In considerable measure the properties of the p-amino diazo compounds depend also on substituents attached to the phenylene ring. A substituent such as a methyl, methoxy, or carboxyl group in a position ortho to the diazonium group, brings about a considerable improvement in stability and at the same time a color shift toward blue. Light sensitivity is, however, lowered by these substituents. The presence of an alkoxy group in a position meta to the diazonium group makes the diazo compounds considerably more light sensitive in relation to the unsubstituted compounds, but the keeping qualities become poorer as a result. Despite their poor stability, this group of diazo compounds is nevertheless important because of their high light sensitivity and their practical use in cases where copies have to be prepared as quickly as possible.

Notwithstanding the general use of such materials because of their high sensitivity, there has been a desire for the production of a high speed diazo type photosensitizer which, while maintaining the light sensitivity of the previously employed materials, eliminates the thermal instability and other disadvantages associated with such materials.

This has now been accomplished in accordance with the present invention by providing a derivative of a unilaterally diazotized para-phenylene diamine having excellent light sensitive characteristics and a substantially lessened degree of thermal instability associated with a cyano alkoxy substituent in a position meta to the diazo group. Thus, it appears as both the speed of reproduction, as well as the thermal instability, of conventionally employed derivatives of diazotized para-phenylene diamine are associated with the electron donating ability of the alkoxy substituent. In accordance with the present invention, the modification of this donation by the inclusion of a cyano group provides for an extremely desirable balance of properties by substantially eliminating the thermal instability of the diazo material, but not appreciably effecting the high speed reproduction properties thereof.

Accordingly, it is principal object of the present invention to provide a novel high speed diazo speed sensitizer which eliminates the inherent deficiencies and disadvantages of previously employed materials.

A further object of the present invention is to provide novel high speed diazo type sensitizers useful in both one-component and two-component diazo reproduction processes, such novel high speed diazo type sensitizers eliminating substantially the inherent thermal instability of meta-alkoxy substituted derivatives of diazotized paraphenylene diamine without appreciably effecting the high-speed reproduction properties thereof.

A still further object of the present invention comprises a novel high speed diazo sensitizer particularly suited for a two-component diazo reproduction process employing ammonia development, such high speed diazo type sensitizer having cyano alkoxy substitution meta to the diazo moiety.

Still further objects and advantages of the novel diazo type sensitizers of the present invention will become more apparent from the following more detailed description thereof.

In accordance with the present invention, the desirable balance of properties allowing the production of a high speed diazo type sensitizer having a substantially reduced degree of thermal stability and a high degree of light sensitivity and reproduction at high speeds is achieved by providing a diazonium salt of the following general formula:

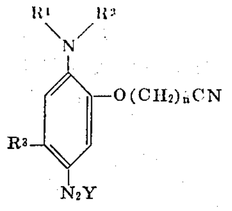

wherein $R^1$ and $R^2$ are selected from alkyl, e.g., lower alkyl of one to four carbon atoms, aralkyl, e.g., benzyl, or the atoms necessary to form a five or six member heterocyclic ring with the nitrogen atom; $R^3$ is selected from the group consisting of hydrogen, alkoxy, e.g., lower alkoxy of one to four carbon atoms, or halogen, e.g., chloro, bromo, or fluoro; *n* is an integer not greater than 4, and Y is an anion.

The salt forming anions which are conveniently employed as the moiety Y in the above general formula can be any of those conventionally employed in derivatives of diazotized para-phenylene diamine. Such anions include, for example, salt forming anions such as sulphate, chloride, phosphate, nitrate, and sulfonate, e.g., para-chlorobenzene sulfonate, as well as preferred double salts of zinc chloride, cadmium chloride, tin chloride, and boro fluoride. Accordingly, in accordance with the preferred embodiment of the present invention, the diazonium salts are utilized as double salts such as chlorostanate, chlorozincate, chlorocadmiate, and borofluoride. All such anionic species are well known in the art and conventionally employed in diazonium salts of the general nature as those of the instant invention.

The heterocyclic ring which can be formed by the moieties $R^1$ and $R^2$ and the amino nitrogen atom can comprise any of the conventional five and six membered nitrogen containing heterocycles conventionally employed in diazonium salts of the general type embraced by the present invention. Thus, for example, suitable heterocyclic rings para to the diazonium moiety include morpholino, piperidino, thiomorpholino, piperazino, pyrrolidino, etc.

The following is a list of suitable diazonium salts falling within the general formula above. Such diazium salts can be present as salts of any and all of the above mentioned anions. Again, double salts, e.g., chlorozincate, chlorostanate, chlorocadmiate, and borofluoride, are preferred.

1. 3-cyanomethoxy-4-(1-pyrrolidinyl)benzenediazonium salt
2. 3-cyanoethoxy-4-(1-pyrrolidinyl)benzenediazonium salt
3. 3-cyanopropoxy-4-(1-pyrrolidinyl)benzenediazonium salt
4. 3-cyanobutoxy-4-(1-pyrrolidinyl)benzenediazonium salt
5. 3-cyanomethoxy-4-N-benzyl-N-methyl benzenediazonium salt
6. 3-cyanoethoxy-4-N-benzyl-N-methyl benzenediazonium salt
7. 3-cyanopropoxy-4-N-benzyl-N-methyl benzenediazonium salt
8. 3-cyanobutoxy-4-N-benzyl-N-methyl benzenediazonium salt
9. 2-methoxy-5-cyanomethoxy-4-(1-pyrrolidinyl)benzenediazonium salt 10. 2-ethoxy-5-cyanomethoxy-4-(1-pyrrolidinyl)-benzenediazonium salt
11. 2-propoxy-5-cyanomethoxy-4-(1-pyrrolidinyl)-benzenediazonium salt
12. 2-butoxy-5-cyanomethoxy-4-(1-pyrrolidinyl)-benzenediazonium salt 13. 2-propoxy-5-cyanopropoxy-4-(1-pyrrolidinyl)-benzenediazonium salt
14. 2-chloro-5-cyanomethoxy-4-(1-pyrrolidinyl)-benzenediazonium salt
15. 2-chloro-5-cyanoethoxy-4-(1-pyrrolidinyl)-benzenediazonium salt
16. 2-bromo-5-cyanopropoxy-4-(1-pyrrolidinyl)-benzenediazonium salt
17. 2-bromo-5-cyanobutoxy-4-(1-pyrrolidinyl)-benzenediazonium salt
18. 2-fluoro-5-cyanomethoxy-4-(1-pyrrolidinyl)-benzenediazonium salt
19. 2-fluoro-5-cyanoethoxy-4-(1-pyrrolidinyl)-benzenediazonium salt
20. 2-methoxy-5-cyanomethoxy-4-N-benzyl-N-methyl benzenediazonium salt
21. 2-ethoxy-5-cyanoethoxy-4-N-benzyl-N-methyl benzenediazonium salt
22. 2-propoxy-5-cyanopropxy-4-N-benzyl-N-methyl benzenediazonium salt
23. 2-butoxy-5-cyanobutoxy-4-N-benzyl-N-methyl benzenediazonium salt
24. 2-chloro-5-cyanomethoxy-4-N-benzyl-N-methyl benzenediazonium salt
25. 6-chloro-5-cyanoethoxy-4-N-benzyl-N-methyl benzenediazonium salt
26. 2-bromo-5-cyanopropoxy-4-N-benzyl-N-methyl benzenediazonium salt
27. 2-bromo-5-cyanobutoxy-4-N-benzyl-N-methyl benzenediazonium salt
28. 2-fluoro-5-cyanomethoxy-4-N-benzyl-N-methyl benzenediazonium salt
29. 2-fluoro-5-cyanopropoxy-4-N-benzyl-N-methyl benzenediazonium salt
30. 3-cyanomethoxy-4-N,N-dimethyl-benzenediazonium salt
31. 3-cyanoethoxy-4-N,N-dimethyl-benzenediazonium salt
32. 3-cyanopropoxy-4-N,N-dimethyl-benzenediazonium salt
33. 3-cyanobutoxy-4-N,N-dimethyl-benzenediazonium salt
34. 2-methoxy-5-cyanomethoxy-4-N,N-dimethyl-benzenediazonium salt
35. 2-ethoxy-5-cyanomethoxy-4-N,N-dimethyl-benzenediazonium salt
36. 2-propoxy-5-cyanomethoxy-4-N,N-dimethyl-benzenediazonium salt
37. 2-butoxy-5-cyanomethoxy-4-N,N-dimethyl-benzenediazonium salt
38. 2-propoxy-5-cyanopropoxy-4-N,N-dimethyl-benzenediazonium salt
39. 2-chloro-5-cyanomethoxy-4-N,N-dimethyl-benzenediazonium salt
40. 2-chloro-5-cyanoethoxy-4-N,N-dimethyl benzenediazonium salt
41. 2-bromo-5-cyanopropoxy-4-N,N-dimethyl-benzenediazonium salt
42. 2-bromo-5-cyanobutoxy-4-N,N-dimethyl-benzenediazonium salt
43. 2-fluoro-5-cyanomethoxy-4-N,N-dimethyl-benzenediazonium salt
44. 2-fluoro-5-cyanoethoxy-4-N,N-dimethyl-benzenediazonium salt
45. 3-cyanomethoxy-4-N,N-diethyl-benzenediazonium salt
46. 3-cyanoethoxy-4-N,N-diethyl-benzenediazonium salt
47. 3-cyanopropoxy-4-N,N-diethyl-benzenediazonium salt
48. 3-cyanobutoxy-4-N,N-diethyl-benzenediazonium salt
49. 3-cyanomethoxy-4-N,N-di-n-propyl-benzenediazonium salt
50. 3-cyanoethoxy-4-N,N-di-n-propyl-benzenediazonium salt
51. 3-cyanopropoxy-4-N,N-di-n-propyl-benzenediazonium salt
52. 3-cyanobutoxy-4-N,N-di-n-propyl-benzenediazonium salt
53. 3-cyanomethoxy-4-N,N-diisopropyl-benzenediazonium salt
54. 3-cyanoethoxy-4-N,N-diisopropyl-benzenediazonium salt
55. 3-cyanopropoxy-4-N,N-diisopropyl-benzenediazonium salt
56. 3-cyanobutoxy-4-N,N-diisopropyl-benzenediazonium salt
57. 2-methoxy-5-cyanomethoxy-4-N,N-diisopropyl-benzenediazonium salt
58. 2-ethoxy-5-cyanomethoxy-4-N,N-diisopropyl-benzenediazonium salt
59. 2-propoxy-5-cyanomethoxy-4-N,N-diisopropyl-benzenediazonium salt
60. 2-butoxy-5-cyanomethoxy-4-N,N-diisopropyl-benzenediazonium salt
61. 2-propoxy-5-cyanopropoxy-4-N,N-diisopropyl-benzenediazonium salt
62. 2-chloro-5-cyanomethoxy-4-N,N-diisopropyl-benzenediazonium salt
63. 2-chloro-5-cyanoethoxy-4-N,N-diisopropyl-benzenediazonium salt
64. 2-bromo-5-cyanopropoxy-4-N,N-diisopropyl-benzenediazonium salt
65. 2-bromo-5-cyanobutoxy-4-N,N-diisopropyl-benzenediazonium salt
66. 2-fluoro-5-cyanomethoxy-4-N,N-diisopropyl-benzenediazonium salt
67. 2-fluoro-5-cyanoethoxy-4-N,N-diisopropyl-benzenediazonium salt
68. 3-cyanomethoxy-4-N-methyl, N-butyl-benzenediazonium salt
69. 3-cyanoethoxy-4-N-methyl, N-butyl-benzenediazonium salt
70. 3-cyanopropoxy-4-N-methyl, N-butyl-benzenediazonium salt
71. 3-cyanobutoxy-4-N-methyl, N-butyl-benzenediazonium salt
72. 3-cyanomethoxy-4-morpholino-benzenediazonium salt
73. 3-cyanoethoxy-4-morpholino-benzenediazonium salt
74. 3-cyanopropoxy-4-morpholino-benzenediazonium salt
75. 3-cyanobutoxy-4-morpholino-benzenediazonium salt
76. 2-methoxy-5-cyanomethoxy-4-morpholino-benzenediazonium salt
78. 2-ethoxy-5-cyanomethoxy-4-morpholino-benzenediazonium salt 77. 2-propoxy-5-cyanomethoxy-4-morpholino-benzenediazonium salt
79. 2-butoxy-5-cyanomethoxy-4-morpholino-benzenediazonium salt
80. 2-propoxy-5-cyanopropoxy-4-morpholino-benzenediazonium salt
81. 2chloro-5-cyanomethoxy-4-morpholino-benzenediazonium salt
82. 2-chloro-5-cyanoethoxy-4-morpholino-benzenediazonium salt
83. 2-bromo-5-cyanopropoxy-4-morpholino-benzenediazonium salt
84. 2-bromo-5-cyanobutoxy-4-morpholino-benzenediazonium salt
85. 2-fluoro-5-cyanomethoxy-4-morpholino-benzenediazonium salt
86. 2-fluoro-5-cyanoethoxy-4-morpholino-benzenediazonium salt
87. 3-cyanomethoxy-4-piperidino-benzenediazonium salt
88. 3-cyanoethoxy-4-piperidino-benzenediazonium salt
89. 3-cyanopropoxy-4-piperidino-benzenediazonium salt
90. 3-cyanobutoxy-4-piperidino-benzenediazonium salt
91. 3-cyanomethoxy-4-thiomorpholino-benzenediazonium salt
92. 3-cyanoethoxy-4-thiomorpholino-benzenediazonium salt
93. 3-cyanopropoxy-4-thiomorpholino-benzenediazonium salt.
94. 3-cyanobutoxy-4-thiomorpholino-benzenediazonium salt
95. 2-methoxy-5-cyanomethoxy-4-piperidino-benzenediazonium salt
96. 2-ethoxy-5-cyanomethoxy-4-piperidino-benzenediazonium salt
97. 2-propoxy-5-cyanomethoxy-4-piperidino-benzenediazonium salt
98. 2-butoxy-5-cyanomethoxy-4-piperidino-benzenediazonium salt
99. 2-propoxy-5-cyanopropoxy-4-piperidino-benzenediazonium salt
100. 2-chloro-5-cyanomethoxy-4-piperidino-benzenediazonium salt
101. 2-chloro-5-cyanoethoxy-4-piperidino-benzenediazonium salt
102. 2-bromo-5-cyanopropoxy-4-piperidino-benzenediazonium salt
103. 2-bromo-5-cyanobutoxy-4-piperidino-benzenediazonium salt
104. 2-fluoro-5-cyanomethoxy-4-piperidino-benzenediazonium salt
105. 2-fluoro-5-cyanoethoxy-4-piperidino-benzenediazonium salt
106. 3-cyanomethoxy-4-piperazino-benzenediazonium salt.
107. 3-cyanoethoxy-4-piperazino-benzenediazonium salt.
108. 3-cyanopropoxy-4-piperazino-benzenediazonium salt.
109. 3-cyanobutoxy-4-piperazino-benzenediazonium salt.

The novel diazonium salts of the present invention are prepared by reacting an appropriate 2-substituted 5-nitrophenol with a chlorine-substituted nitrile, e.g., chloroacetonitrile, chloropropionitrile, chlorovaleronitrile, etc., to produce a 5-nitro-2-substituted phenoxy acetonitrile, etc.

Such 5-nitro-2-substituted phenoxy acetonitrile, etc. is converted to the corresponding amine compound by the catalytic reduction of the nitro group. The amine is subsequently diazotized by convention diazotization with sodium nitrite, etc. to produce the desired cyanoalkoxy-substituted diazo compound. The corresponding diazonium salt is produced, for example, by the reaction of the diazo compound with hydrochloric acid and zinc chloride to produce the chlorozincate double salt.

Of course, the process of producing the novel diazonium salts of the present invention will be more fully described in reference to the specific examples set forth hereinbelow.

As set forth above, while the diazonium salt sensitizers of the present invention are effectively employed in both one-component and two-component diazo reproduction processes, the diazonium salts of the present invention are particularly suited for two-component dry processes, wherein development is achieved by the utilization of ammonia gas.

In such two-component diazo reproduction processes, a coupling compound is generally intimately mixed with the diazo sensitizer and stabilized against premature coupling. Development is effected by a dry process wherein coupling of the diazo compound and coupling compound is caused by passage of the light exposed material through an alkaline gas, e.g., ammonia. By including a component in the two-component layer which generates alkali on heating, coupling is caused by heating to effect the conversion in the diazo material of such component into an alkaline reagent.

Suitable coupling components that can be employed in conjunction with the diazonium salts in the two-component diazo reproduction process include, for example:

6,7-dihydroxy naphthalene-2-sulfonic acid sodium salt
2-(m-hydroxy phenoxy) ethanol
2,3-dihydroxy naphthalene
1,8-dihydroxy naphthalene
phloroglucinol
resorcinol
octyl resorcinol
α-resorcinol amide
3-methyl-1-phenyl-5-pyrazolone
acetyl actanalide
2,3-dihydroxy naphthalene-6-sulfonic acid
2,5-xylenol
2-methyl resorcinol
7-hydroxy-1,2-naphthoimidazole
2-naphthol-3-6-disulfonic acid, etc.

Acid stabilizers which are generally employed to present the precoupling of the diazonium salt and coupling component include organic acids such as citric acid, tartaric acid, boric acid, acetic acid, etc. as well as inorganic acid such as sulfuric acid, perchloric acid, etc. Other additives which are generally included in the light sensitive diazo layer to prevent precoupling include acidic salts such as zinc chloride, magnesium chloride, cadmium chloride, etc.

In addition to the foregoing stabilizing materials other additives generally employed in diazo type photo printing can also be employed in conjunction with the diazonium salt of the present invention. Such materials include, for example, substances serving to increase the developing speed, such as glycerol, polyethylene glycol and urea, surface improving substances such as finely divided silica (colloidal or non-colloidal), aluminum oxide, barium sulfate, white starch, etc., binders such as gelatin, gum arabic, cellulose ethers, starch derivatives, polyvinyl alcohol, dispersions of synthetic resins such as dispersions of cationic, nonionic and anionic polyvinyl acetate, substances serving to improve the background of the copies such as thiourea, etc.

In accordance with the present invention, diazo compositions can be applied to any conventional support employed in diazo reproduction processes. Thus, for example, the diazo material may be applied to an opaque support such as white paper or opaque linen, or a transparent support such as tracing paper, tracing linen, cellulose ester foil, polyester foil, transparentized paper, and the like. In addition, the diazonium salt composition can be applied directly to the surface of the support or may be present in a hydrophilic film layer which may or may not be attached to the support by means of one or more conventional sub-layers.

As indicated previously, the diazonium salts of the present invention are not only applicable to a two-component dry diazo reproduction process, but can also be utilized in a one-component wet process, wherein the diazo composition does not contain a coupling agent or an acid stabilizer to prevent premature coupling, but the coupler is supplied in a solution of developing agent. In such one-component diazo reproduction processes, it is possible to employ any conventional developing solution. Thus, for example, various conventional developing solutions based upon phloroglucinol are conveniently employed. The following represent weakly acid phloroglucinol developers and weakly alkaline phloroglucinol developers which are practically employed in the development of one-component diazo compositions.

Developer A is a solution of:

| | | |
|---|---|---|
| Phloroglucinol | g | 4 |
| Acetoacetanilide | g | 0.1 |
| 2-ethyl 1-hexanosulphate Tergitol 08 (from Union Carbide & Carbon Corp., New York U.S.A.) | g | 3 |
| Beet sugar | g | 15 |
| Benzoic acid | g | 2.5 |
| Sodium benzoate | g | 14 |
| Sodium formate in 1000 ml of water | g | 135 |

The pH of this liquid is approximately 5.8.

Developer B is a solution of

| | | |
|---|---|---|
| Phloroglucinol | g | 6.5 |
| Resorcinol | g | 4 |
| Thiourea | g | 10 |
| Sodium salt of butylnaphthalene sulphonic acid Sorbit P (from Geigy Chem. Corp., Ardsley, N.Y., U.S.A.) | g | 2 |
| Sodium formate | g | 14 |
| Sodium benzoate | g | 22 |
| Trisodium citrate (2aq.) | g | 49 |
| Citric acid | g | 1.2 |
| Water | ml | 1000 |

The pH of this liquid is 6.5.

Developer C is a solution of:

| | | |
|---|---|---|
| Phloroglucinol | g | 5 |
| Rescorcinol | g | 1 |
| Dipotassium phosphate | g | 3 |
| Tergitol 08 | ml | 3 |
| Maleic anhydride | g | 52 |
| Potassium hydroxide solution (13.5 N) | ml | 75 |
| Water | ml | 1000 |

The pH of this liquid is 6.9.

Developer D is a solution of:

| | | |
|---|---|---|
| Thiourea | g | 30 |
| Phloroglucinol | g | 5.4 |
| Resorcinol | g | 6.5 |
| Potassium salt of hydroquinone-mono sulphonic acid | g | 1 |
| Sorbitol | g | 5 |
| Beet sugar | g | 15 |
| Potassium tetraborate (5 aq.) | g | 50 |
| Isopropylnaphthalene sulfonic acid | g | 1.5 |
| Water | g | 1000 |

Similarly the diazonium salts of the present invention are applicable in diazotype systems wherein the reproduction process utilizes heat development. In this type of system the light-sensitive layer or stratum includes a diazonium compound, a coupler, and acidic stabilizing materials as in the dry two-component system described above. In addition, however, the light-sensitive layer includes a material which causes an alkaline reaction when heated, the heat causing the generation of an alkaline substance which in turn neutralizes the acidic stabilizing materials and creates a condition whereby the diazonium compound and the coupler can unite.

The preferred compounds which produce such an alkaline reaction when heated are those which generally yield ammonia upon decomposition or dissociation. Such compounds include, for example, the ureas, i.e., urea and its derivatives, in particular, guanadine, alkyl-substituted urea, and alkyl-substituted guanadines.

The present invention will now be described by reference to specific examples. It is to be understood, however, that the present invention is in no way to be deemed aa limited thereto, but must be construed as all or any equivalents thereof.

EXAMPLE 1

Preparation of 5-nitro-2(pyrrolidinyl)phenoxy acetonitrile

A mixture of 13 g of 2-(1-pyrrolidinyl)-5-nitrophenol, 8 g of potassium carbonate, 8 g of chloroacetonitrile, and 200 ml of acetone was heated to reflux 20 hours, concentrated and the residue mixed with water. The product was recrystallized from ethanol to give red crystals, m.p. 135°–136°.

Preparation of 5-amino 2-(1-pyrrolidinyl acetonitrile

A mixture of 13.5 g of 5-nitro-2-(1-pyrrolidinyl) phenoxyacetonitrile, 20 g iron powder, 30 ml of water, 200 ml of ethanol and 3 ml of concentrated hydrochloric acid was heated to reflux until reduction of the nitro group was complete (about 2 hours). The mixture was made alkaline with sodium carbonate solution and filtered. The filtrate was concentrated and mixed with water. A yield of 10 g. of amine was obtained and was used directly in the diazotization.

3-Cyanomethoxy-4-(1-pyrolidinyl)benzenediazonium FLUOROBORATE

A solution of 10 g. of 5-amino-2-(1pyrrolidinyl) phenoxyacetonitrile in 30 ml. of water and 50 ml of 6N hydrochloric acid was cooled to 0° and diazotized with sodium nitrite solution. The reaction was treated with 8 ml. of 48 percent fluoboric acid and the solid which separated was collected on a filter, washed with a little water and dried. The diazonium compound was purified by dissolving in acetone and slowly precipitating with ether to give a yellow crystalline solid, m.p. 122°–123° (decomposition).

A diazo composition was prepared by admixing the following components:

| | | |
|---|---|---|
| 3-Cyanomethoxy-4-(1-pyrrolidinyl)benzenediazonium borofluoride | | 1 g |
| Zinc chloride | | 4 g |
| Saponin | | 0.1 g |
| Citric Acid | | 3 g |
| 6,7-Dihydroxynaphthalene-2-sulfonic acid sodium salt | | 3 g |
| Thiourea | | 2 g |
| Isopropanol | | 2 cc |
| Water | to | 100 cc |

The above solution was coated on a suitable paper base, dried, and exposed to light through a translucent original. A clear print was obtained after treatment with ammonia vapor. A bright blue image against a clean background was formed, which image showed resistance to diazo decomposition when printed at high machine speeds.

EXAMPLE 2

Preparation of 4-butoxy-2-morpholino-5-nitrophenoxyacetonitrile

A mixture of 20 g of 4-butoxy-2-morpholino-5-nitrophenol, 20 g potassium carbonate, 8 ml of chloroacetonitrile, and 200 ml of acetone was heated to reflux for 4 hours. The reaction was concentrated and the residue mixed with water. The solid which separated was recrystallized from ethanol and melted at 101°–102°.

Preparation of 2-butoxy-5-cyanomethoxy-4-morpholinobenzenedianzonium chlorozincate A mixture of 20 g of 4-butoxy-2-morpholino-5-nitrophenoxyacetonitrile, 40 g of iron powder, 200 ml of ethanol, 30 ml of water, and 5 ml of concentrated hydrochloric acid was heated to reflux for 5 hours, cooled, made alkaline, and filtered. The filtrate was evaporated and mixed with water. The mixture was extracted with ether and the ether treated with hydrogen chloride gas to precipitate the amine (9 g) which was dissolved in 15 ml of concentrated hydrochloric acid and 25 ml of water. The solution was cooled and diazotized in the usual manner with sodium nitrate solution. The diazonium salt separated on the addition of zinc chloride solution. The compound was recrystallized from ethanol.

Anal. Calc'd. for $C_{32}H_{42}Cl_4N_8O_6Zn$ : C, 45.65; H, 5.03
Found : C, 45.45; H, 5.26

The diazonium salt produced below was used in the composition of Example 1, replacing the diazonium salt present therein in an equal amount. Again, the diazo solution was coated on a suitable paper base, dried, and exposed to light through a translucent original. After development by treatment with ammonia vapor, a print of good dye density and background was obtained. The print showed a high degree of resistance to thermal decomposition also.

Similar results are obtained if a plastic foil of a polyester-type, e.g., a polyethylene glycol terephthalic acid ester foil, or a textile fabric, e.g., linen, is used as the support for the light-sensitive layer.

EXAMPLE 3

Example 1 is repeated, except that the diazonium sensitizer is replaced by an equivalent amount of the following materials:

A. 3-cyanopropoxy-4 -(1-pyrrolidinyl)benzenediazonium chloride
B. 3-cyanomethoxy-4-N-benzyl-N-methyl benzenediazonium chlorostannate
C. 2-ethoxy-5-cyanomethoxy-4-(1-pyrrolidinyl)-benzenediazonium chlorozincate
D. 2-chloro-5-cyanomethoxy-4-(1-pyrrolidinyl)-benzenediazonium chlorocadmiate
E. 2-bromo-5-cyanopropoxy-4-N-benzyl-N-methyl benzenedaizonium chlorozincate
F. 3-cyanomethoxy-4-N,N-dimethyl-benzenediazonium borofluoride
G. 2-bromo-5cyanobutoxy-4-N,N-dimethyl-benzenediazonium borofluoride
H. 3-cyanobutoxy-4-N,N-diethyl-benzenediazonium sulfate
I. 3-cyanopropoxy-4-N,N-di-n-propyl-benzenediazonium nitrate
J. 2-fluoro-5-cyanoethoxy-4-N,N-diisopropyl-benzenediazonium chlorostannate
K. 3-cyanomethoxy-4-N-methyl, N-butyl-benzenediazonium chlorozincate
L. 3-cyanoethoxy-4-morpholino-benzenediazonium phosphate
M. 2-ethoxy-5-cyanomethoxy-4-morpholino-benzenediazonium borofluoride
N. 2-chloro-5-cyanomethoxy-4-morpholino-benzenediazonium borofluoride
O. 3-cyanopropoxy-4-piperidino-benzenediazonium p-chlorobenzenesulfonate
P. 3-cyanomethoxy-4-thiomorpholino-benzenediazonium chlorocadmiate
Q. 2-methoxy-5-cyanomethoxy-4-piperidino-benzenediazonium chlorocadmiate
R. 2-propoxy-5-cyanopropoxy-4piperidino-benzenediazonium chlorozincate
S. 2-fluoro-5-cyanomethoxy-4-piperidino-benzenediazonium chlorozincate
T. 3-cyanomethoxy-4-piperazino-benzenediazonium chlorostannate In all cases, substantially equivalent results are obtained.

EXAMPLE 4

A sheet of white base paper suitable for the diazotype reproduction process was sensitized with a solution of;

17.5 g. of 3-cyanomethoxy-4-(1-pyrrolidinyl) benzenediazonium borofluoride ,
4 g. tartaric acid ,
1.5 g. boric acid, 2.5 g. gelatin ,
30 ml. of a polyvinyl acetate dispersion, and
1,000 m. of water; and dried.

In an exposure apparatus generally employed in the diazotype reproduction process, such sheet containing the sensitized coating was exposed underneath a transparent ink drawing until the diazonium compound underneath the image-free portions of the drawing had been bleached out.

After this, the sheet was developed with the developer A described above according to the so-called thin layer method. The diazonium compound showed high coupling activity, and the development of a clear, bright image without any tendency toward thermal instability or decomposition.

While the present invention has been described primarily with respect to the foregoing specific examples, it is to be understood that the present invention is in no way to be deemed as limited thereto, but must be construed as broadly as all or any equivalents thereof.

I claim:

1. A process for two-component diazotype reproduction which comprises exposing a diazotype material imagewise to actinic light, said material comprising a support and a light sensitive composition coated thereon, said composition comprising a diazonium salt, coupling component and acid stabilizer wherein said diazonium salt is a compound of the formula

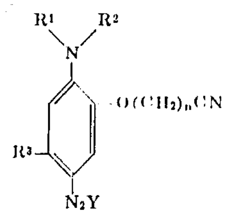

wherein:

$R^1$ and $R^2$ are selected from the group consisting of alkyl having from one to four carbon atoms, benzyl, and when taken together with the amino nitrogen atom, the atoms necessary to form a heterocyclic selected from the group consisting of morpholino, piperidino, thiomorpholino, piperazino, and pyrrolidino; $R^3$ is selected from the group consisting of hydrogen, lower alkoxy, and a halogen selected from the group consisting of fluorine, chlorine and bromine, *n* is an integer of from 1 to 4; and Y is an anion, and developing the diazotype material to form a positive azo dye image by treatment with ammonia.

2. The process of claim 1 wherein said diazonium salt comprises:

3-cyanomethoxy-4-(1-pyrrolidinyl)benzenediazonium borofluoride.

3. The process of claim 1 wherein said diazonium salt comprises:

2-butoxy-5-cyanomethoxy-4-morpholinobenzenediazonium chlorozincate.

* * * * *